INVENTOR.
HAROLD E. CLARK
BY Stanley Z. Cole
ATTORNEY

INVENTOR.
HAROLD E. CLARK
BY Stanley Z. Cole
ATTORNEY

INVENTOR.
HAROLD E. CLARK
BY
Stanley Z. Cole
ATTORNEY

United States Patent Office 3,343,142
Patented Sept. 19, 1967

3,343,142

XEROGRAPHIC CODING AND INFORMATION STORAGE ON A SPECULAR BUSINESS MACHINE CARD

Harold E. Clark, Penfield, N.Y., assignor to Xerox Corporation, Rochester, N.Y., a corporation of New York Filed Jan. 2, 1963, Ser. No. 248,974
6 Claims. (Cl. 340—173)

ABSTRACT OF THE DISCLOSURE

Method and apparatus for information storage and retrieval in which information to be stored and retrieved is xerographically formed in reduced configuration on a storage media having a specularly reflecting surface and is encoded with an indexing code. The specular media is then stored and retrieved according to the indexing code. Upon retrieval the information thereon may be viewed or reproduced by apparatus in which light is reflected from the specular surface which is not diffused but is reflected with a very high degree of efficiency.

*Background of the invention*

This invention relates to information storage and retrieval systems and in particular to the use of novel storage media in such systems. Factual data, statistics and the like, lend themselves readily to computer operated storage systems of today, commonly using magnetic tapes, punched cards, and punched tapes as storage media. Storage and retrieval of more abstract information such as literary abstracts, letters, books, and other documents present much more complex problems. While the greatest obstacle in this area has been and is the classifying and coding of such material for high speed retrieval, there is, nevertheless, room for considerable facilitation in the more mechanical elements of information storage and retrieval systems. In the past the storage medium for information storage and retrieval has consisted mainly of microfilm in either reels or small chips. The present invention offers an improved alternative.

It is sometimes preferred to store information in the form of file cards of a size generally in the range of 3¼" x 7½". Such cards are easily handled, and a filing system containing them presents no problem when it is necessary to add or delete information to or from the file. These cards are readily indexed by different coding means such as edge punching, coordinate punching over the face of the card, or by applying detectable material to the surface of the card in accordance with a coordinate system or the like. However, in order to use these cards for retrieving documentary information, it is either necessary to use the cards in a separate search file with cross-reference to the information storage file, or it is necessary to store the information in a condensed but usable form on the card itself. This can be done as by one recent technique in which the documents are greatly reduced in size by microfilm processes and are positioned in apertures formed in the cards for that purpose. There is, however, increased expense in the necessity of using two different forms of storage media for the same stored document. Where the aperture cards are used, the card may be considered one media and the film chip to be placed in the aperture as a second media. The former is used to carry the indexing information and the latter to store the documentary information itself. Adding the film chips to the cards is either a manual process or a complex machine process which adds complication and expense to the total process. In addition, difficulties have been experienced in the handling of such cards in business equipment.

The storage of microimages requires means of reducing the image size by several orders of magnitude while maintaining sufficient resolution to enable re-enlargement to full size without significant deterioration of the image. A further requirement in the use of microimages is that the image be projectable with a relatively efficient use of light. This is necessary since in the enlargement process the light illuminating the small area of film is the maximum amount of light that can be utilized to show the image when enlarged to several times the size of the original illuminated area. In the past this has ruled out the use of information from an opaque image since much of the light is lost by absorption and diffusion. The microfilm serving as a transparency through which the light is transmitted absorbs some percentage of the light but diffuses relatively little of it as compared to the usual reflection system. Thus, in the past there has seemed little alternative to the use of microfilm for reduced size document storage and the film stock itself has been too expensive and difficult to handle to use for the entire file card.

*Summary of the invention*

Now in accordance with the present invention, a new media and process for storing reduced size information images has been discovered which permits the ready use of the same storage media for both a reduced size image of the stored document and an indexing code. To accomplish this, the invention uses a media with a specularly reflecting surface so that light reflected from it is not diffused but is reflected with a very high degree of efficiency. Thus, it is an object of the invention to define an information retrieval and storage method and system in which a document to be stored and its indexing code are placed on the same storage media.

It is an additional object of the invention to define a reduced size image storage method of relatively low complexity and expense.

It is an additional object of the invention to define an information storage and retrieval system using xerographically formed reduced size images.

It is an additional object of the invention to define apparatus for information storage and retrieval using xerography.

It is still a further object of the invention to define a novel storage media for document storage systems.

Further objects and features of the invention will become apparent while reading the following description in connection with the drawings.

*Description of the preferred embodiments*

The present invention comprehends an information storage and retrievel system utilizing opaque business-machine-type data cards for reduced-size information storage and retrieval. While, as will be seen below, these cards may be physically altered for coding purposes as by punched holes or notches, there is preferably no destructive physical or chemical alteration of the card. Thus, in a preferred embodiment both information and coding data are applied as a printed deposit on the card. This printed deposit is applied by xerographic printing apparatus, while viewing with optional printout is accomplished by adaptation of a highly efficient projection-by-reflection optical system now known to the xerographic art as PROXI. The PROXI system is explained in detail in "Photographic Science and Engineering," March-April, 1961, at pages 87 to 92.

Figure 1:
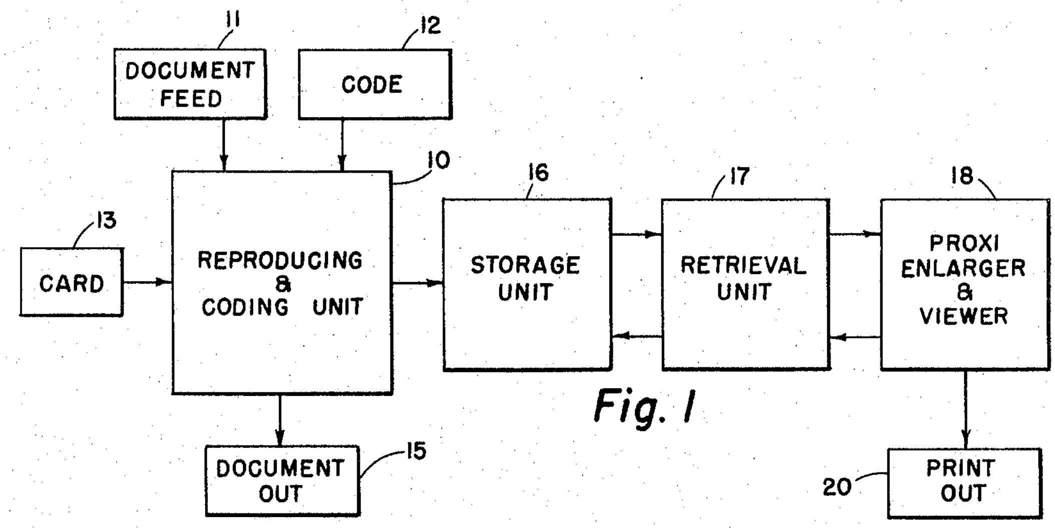
FIG. 1 is a block diagram of an information storage and retrieval system.
Figure 7:
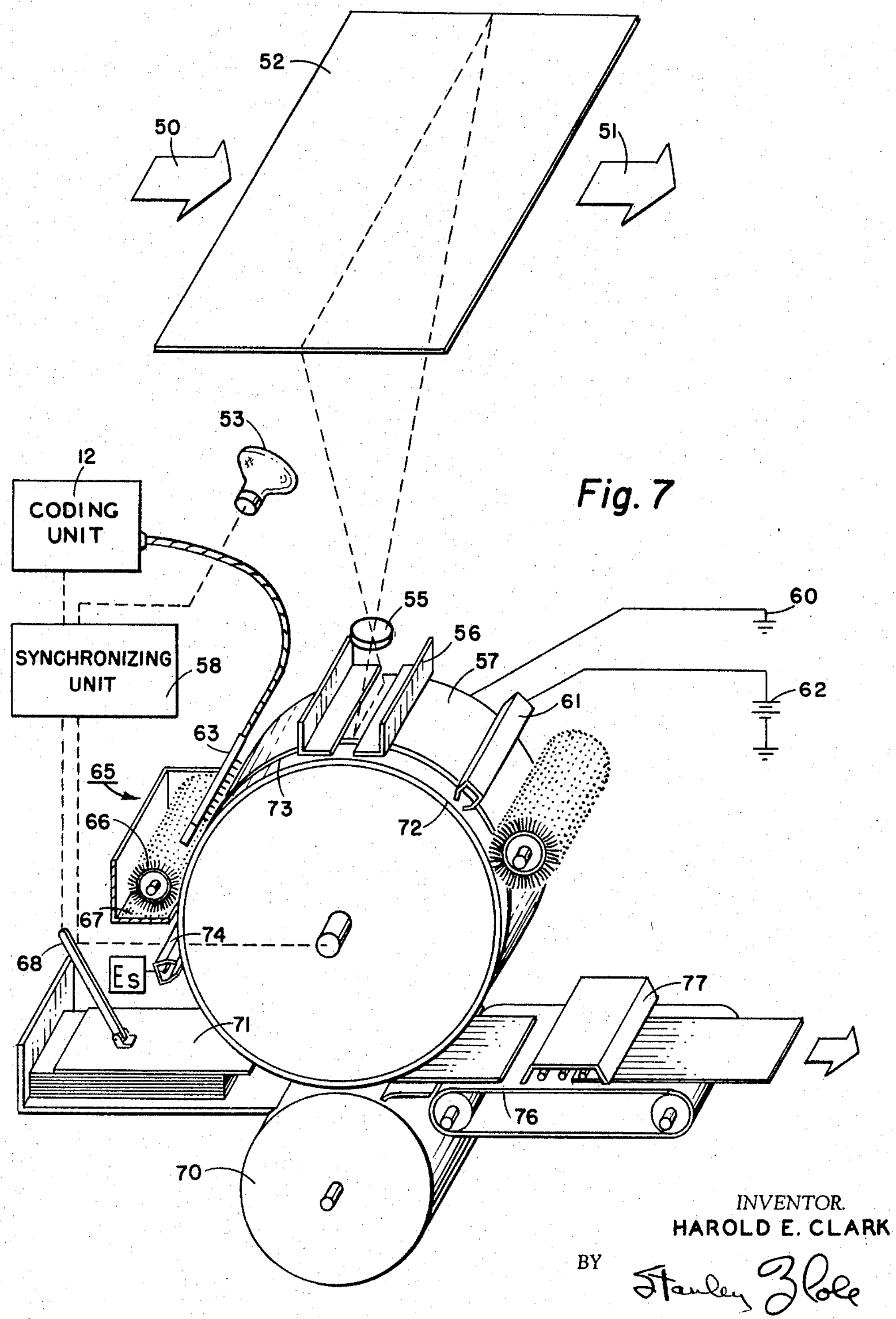
FIG. 7 is a diagrammatic illustration in perspective of one embodiment of the reproducing and coding unit, block 10, of FIG. 1.
Figures 8, 9, 10:
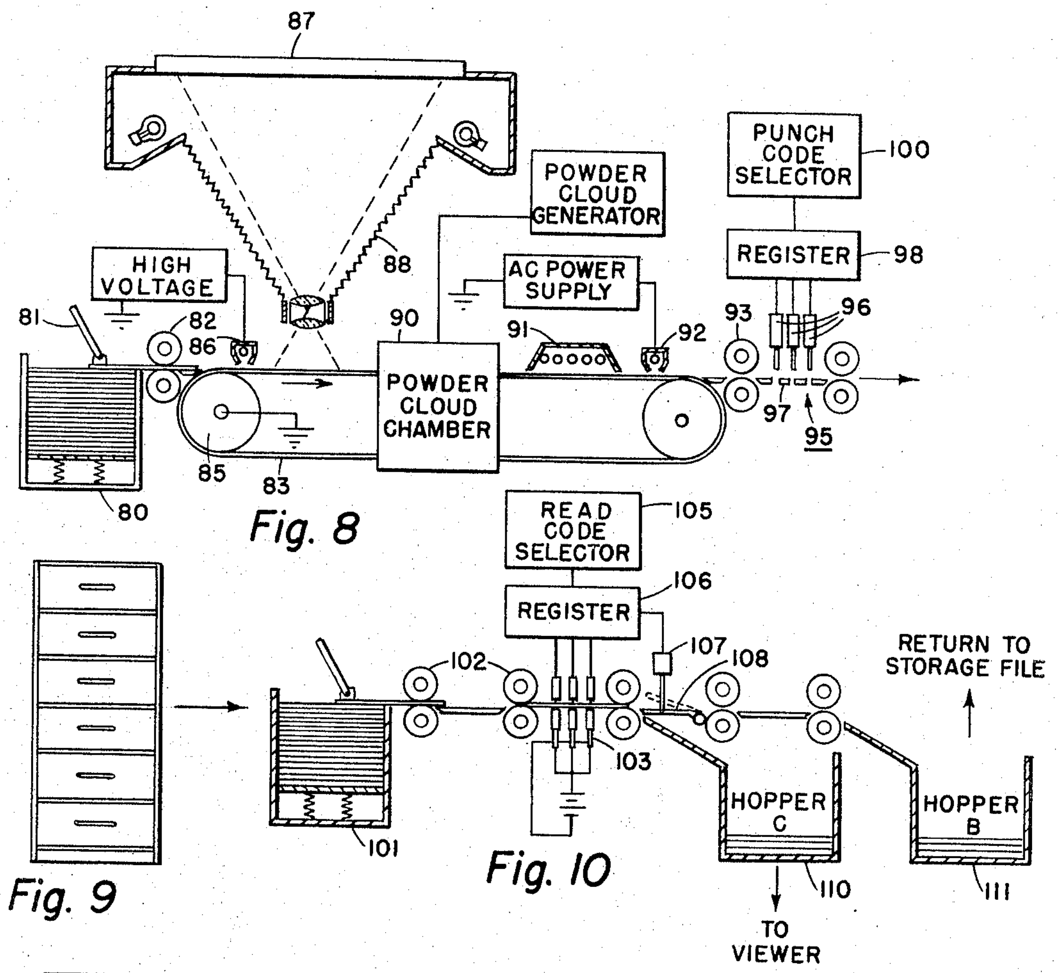
FIG. 8 is a diagrammatic illustration of a second embodiment of the reproducing and coding unit, block 10, of FIG. 1.
FIG. 9 is a front elevation of an embodiment of the storage unit, block 16, of FIG. 1.
FIG. 10 is a diagrammatic illustration of an embodiment of the retrieval unit, block 17, of FIG. 1, and, FIG. 11 is a diagrammatic illustration of a PROXI enlarger-viewer with printout, blocks 18 and 20, of FIG. 1.

FIG. 1 is a generally conventional block diagram of an information storage and retrieval system adapted for the handling of opaque storage cards in accordance with the present invention. Of particular interest is block 10, embodiments of which are illustrated in FIGS. 7 and 8 to be described in detail elsewhere in this disclosure. Block 10 represents a xerographic apparatus including a camera, or optical system, which will accept a document such as a business letter or the printed page of a book and project an illumination pattern of it in reduced size onto a sensitive xerographic surface. Thus, a latent electrostatic image of the document is formed on the xerographic surface with size reduction. Coding information may be provided by exposing a portion of the sensitive xerographic surface to a light pattern representing the code, by charging or discharging a portion of the xerographic surface by needle-type corona electrodes or the like in a coded pattern, or by applying the code information in a separate mechanical punching operation. The latent electrostatic image on the xerographic surface is then developed by conventional xerographic development means. Documentary information is supplied to xerographic apparatus 10 manually or by an automated magazine feed represented by block 11. Coding information is added by a coding means represented by block 12 and information storage cards in accordance with the invention are fed in from magazine 13. Reproducing and coding unit 10 thus reproduces the documentary information in reduced size on storage cards and adds coding information. The original documents are fed out to hopper 15 and the storage cards are transported to storage unit 16. Associated with storage unit 16 is retrieval unit 17 adapted to sort the stored cards and retrieve any carrying a selected code or combination of codes. The information on retrieved cards is readily viewed by PROXI enlarger-viewer 18. PROXI enlarger-viewer 18 is an image projection system substantially of the type disclosed in the "Photographic Science and Engineering" article cited above. As therein disclosed, an image to be projected comprises light diffusing image material on a specular reflecting surface. The projection optical system is arranged to receive light directed from a projection light source and specularly reflected from the image member. The specularly reflected light is projected onto a viewing screen such as frosted glass arranged to display the image with the desired magnification of size. When it is desired to printout a copy of the stored information, the specularly reflected light is used to illuminate a photosensitive surface such as photographic paper, sensitized electrophotographic paper, a sensitized xerographic member having a metallic backing or the like. Printout unit 20 handles the copy paper and performs the necessary developing steps to supply a full size copy of the stored information.

Figure 2:
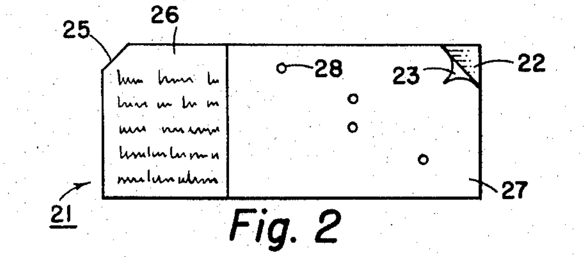
FIGURES 2, 3, 4, and 5 are diagrammatic representations of information storage cards in accordance with the invention.

FIGURES 2, 3, 4, and 5 are embodiments of information storage cards in accordance with the invention. While the size and shape of the cards is not of particular significance, cards have been used in the general shape and dimensions of business machine cards. For example, a suitably dimensioned card is 3¼" x 7½". Particular dimensions would be determined by the requirements of the particular storage system or card handling equipment. As illustrated in FIG. 2, card 21 is appropriately made of a heavy paper or a cardboard base 22 covered with a highly reflective coating 23 such as metal foil or an evaporated metal film, the particular material being chosen for its specular or mirror-like reflection qualities as well as cost and ease of application. Absolute reflectivities of about 75% to 95% are readily achieved and have proved satisfactory. By way of example, tin and aluminum have given excellent results. A solid metallic card is also suitable, but for high volume systems would have a prohibitive cost. Polished aluminum cards have been produced with an absolute reflectivity of 82%. While it is not necessary that any particular markings be added to these cards, in some instances it might be desirable to add numbering systems that would make it possible to read codes on the card manually, or to otherwise interpret information printed on the card. It is also sometimes desirable to modify some part of the card so that the position the card rests in can be determined mechanically. Thus, for example, one corner 25 of the card 21 may be cut off at a slant as is common practice in business machine cards.

In accordance with the invention, it has been found that a developed xerographic image of a document can be readily transferred to a portion 26 of card 21. The remainder 27 of the card can then be used for coding information descriptive of the material in the image. This coded information may be supplied in the form of black dots 28 which can be read by a retrieval machine using photodetection means to distinguish relative difference in reflection of light from dot areas as opposed to non-dot areas. These dots may, if desired, be placed on the cards xerographically and may optionally comprise magnetic material allowing for magnetic detection for handling. Suitable magnetic development material is disclosed in Canadian Patent 565,656 to Rheinfrank.

Figure 3:
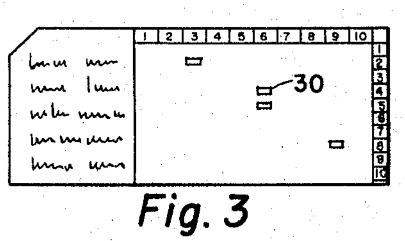

FIGURE 3 illustrates an information storage card similar to that of FIGURE 2 but using punched apertures 30 for the retrieval code rather than black dots. Along the margins of portion 27 of the card in FIGURE 3, a coordinate numbering system is printed on the card to permit a numerical identification of the position of each aperture. These numbers are useful in manual handling, but since it would be expected that all handling of these cards would be by machine, the coordinate numbering on the card is not essential.

Figure 4:
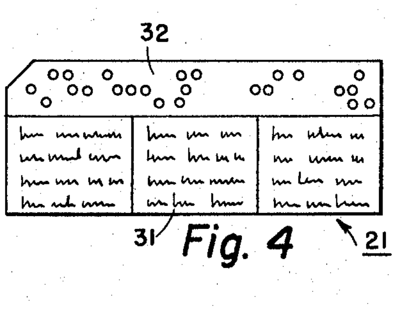

FIGURE 4 illustrates a further way in which information can be placed on a card 21 substantially the same as the card 21 of FIGURE 2. Thus, it is illustrated in FIGURE 4 a plurality of pages of information to be stored can be reproduced in reduced size on card 21 side by side across long dimension 31 of the card. Margin 32 along the length of the card can then be used to carry dots or punched coding information. It is contemplated that a card of the type illustrated in FIGURE 4 can be coded in the ways that punched tape or other tape is coded for data recording. An example of a paper tape data recording and read-out system using black dots as suggested here is the "Omni-Data" paper tape equipment of Omnitronics, Inc., Philadelphia, Pa.

Figure 5:
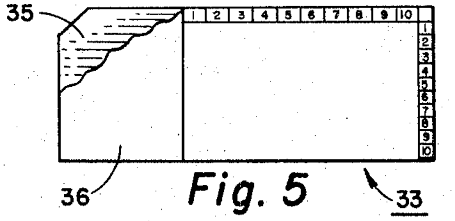

The information storage card according to the embodiments of FIGS. 2, 3, and 4 is adapted to receive a developed xerographic image transferred from a reusable xerographic image transferred from a reusable xerographic plate. FIG. 5 is an embodiment of an information storage card in which the card itself serves the function of the xerographic plate and the image is reproduced directly on the card without the requirement of transfer. Thus, storage card 33 of FIG. 5 comprises transparent photoconductive insulating layer 36 supported on relatively conductive backing 35. In accordance with the invention, the backing has a specularly reflective surface. The backing can be a plastic or cellulosic material appropriately treated to increase its electrical conductivity and having a metalized surface coating for reflective qualities. Backing 35 is also suitably a heavy metal foil or thin metal sheet material with a highly polished surface. Transparent organic photoconductive insulating layer 36 such as is known to the art is coated over the specular surface with little deterioration in the specular qualities. Apparatus for utilizing the storage card of FIG. 5 is illustrated in FIGS 8 to 11, while apparatus for applying information to the storage cards of FIGS. 2 to 4 is illustrated in FIG. 7.

Figure 6:
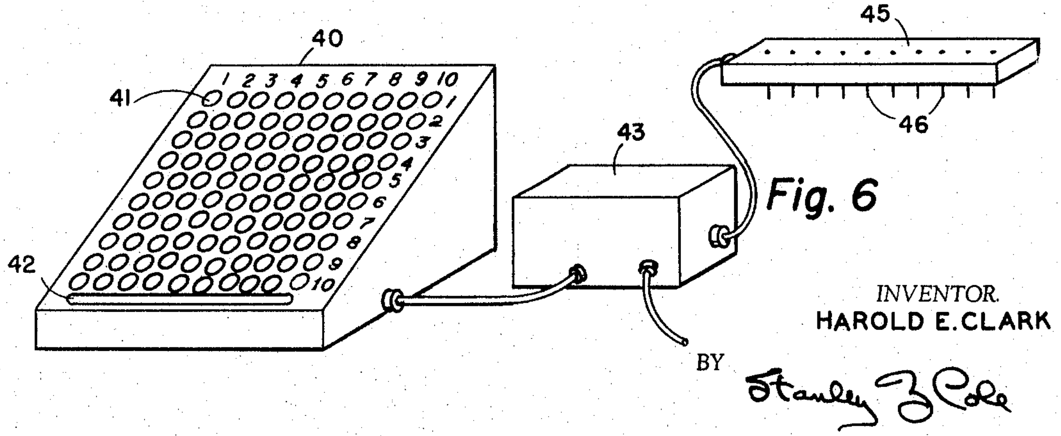
FIG. 6 is a diagrammatic illustration in perspective of coding apparatus.

FIGURE 6 is a simplified perspective view of an embodiment of coding unit 12 for coding the storage card of FIGURE 2. Control unit 40 contains a bank of 100 keys 41 each representing an intersection of a 10 x 10 coordinate system. In order to form coded dots at the desired locations on a card 21, the keys corresponding to the desired coordinate locations are pressed. After all the proper keys have been pressed, action bar 42 is depressed to start the recording action. Electrical information indicative of the keys pressed is synchronized by synchronizing unit 43 so that a discharge voltage appears on the appropriate electrode of discharge array 45 in proper coordination with the operation of the rest of the equipment as will be further understood upon description of FIGURE 7. Electrodes 46 are pointed electrodes adapted to produce an electrical discharge which may be collected on an insulating surface. The electrical charge collected on the insulating surface may then be developed by conventional xerographic developing means and transferred to card 21 to provide a black dot in the proper coding location.

An embodiment of reproducing unit, block 10, in FIGURE 1, is illustrated in FIGURE 7. This apparatus has the function of accepting documents, storage cards, and coding information and producing cards for the storage files carrying reduced size reproductions of the documents and pigmented dots representing the coding information. Arrow 50 represents document feed 11 of FIGURE 1 while arrow 51 represents document outhopper 15. A document 52 to be recorded and stored is positioned in an optical system to reflect light from source 53 through lens system 55 and slit 56 onto xerographic drum 57. Xerographic drum 57 is a conductive drum carrying a photoconductive insulating material such as vitreous selenium on its surface. This drum is rotated in proper synchronization with the operation of the other elements of the apparatus by means of synchronizing unit 58. The conductive substrate of drum 57 is connected to an electrical reference 60. Positioned preceding exposure slit 56 in the direction of rotation of drum 57 is a corona discharge device 61. Corona discharge device 61 is connected to a high voltage source 62 represented here as having a positive polarity. While generally it has been found preferable to use such a positive polarity when the photoconductive insulating surface of the xerographic drum is selenium, the invention is not restricted to this and with some types of photoconductive insulators a negative polarity is preferred for the corona discharge device. The coding information which may represent unitterm descriptors, for example, is entered into coding unit 12. This coding unit is represented as block 12 of FIGURE 1, a more detailed embodiment of which is illustrated in FIGURE 6. When the coding information has been entered into the register of coding unit 12, the operation of the xerographic reproducing unit is commenced as by, for example, pushing action bar 42 of the coding unit illustrated in FIGURE 6. Drum 57 rotates under corona discharge device 61 which places an electrostatic charge on the photoconductive insulating surface. As light source 53 is turned on, an illumination pattern reflected from document 52 is focused on the charged surface of drum 57 to produce a latent electrostatic image of document 52 on the surface of drum 57. Proper synchronization of the slit projection with the movement of the drum is provided as by movement of lens system 55. As drum 57 continues around, array 63 of electrical discharge electrodes is activated to selectively discharge dot areas of the charged xerographic drum in accordance with the code registered in coding unit 12. With the drum carrying a positive electrostatic charge on its surface, a pointed electrode carrying a negative voltage will discharge a small portion of the positively charged plate area. The array of electrodes 63 may also be adapted to produce an alternating current corona discharge which will also serve to neutralize the charge on the surface of the xerographic drum passing under the energized electrodes. The coding function may also be produced by an array of light sources arranged to illuminate drum 57 with a dot pattern selected as by control unit 40 of FIG. 6. As may be seen in FIGURE 2, it is contemplated that the operation of this apparatus is so synchronized that the exposure corresponding to document 52 will be effective on one portion of the drum while the dot pattern produced by array of electrodes 63 will be formed on other related portions of the drum. Thus synchronizing unit 58 will activate the coding apparatus to record dots on a first portion of the xerographic drum and will activate the light source 53 to expose a second portion of the drum to the document image. With 7½" x 3¼" storage cards of this type illustrated in FIG. 2, said first portion is suitably about a 5¼" portion along the circumference of drum 57 while said second portion is the next 2¼" in the counter-rotational direction. Continued rotation then brings the drum through developing station 65 which is illustrated as a brush developing device. The brush 66 rotates through a bed 67 carrying xerographic developing material which is attracted to the bristles of the brush by triboelectric action. The brush then carries the xerographic developing material to the surface of the drum 57 where it is selectively deposited in the areas where the drum has been discharged. The charge polarity on the drum and triboelectric properties of the developer determine whether charged or uncharged areas are developed. With appropriate modifications as are known in the art, charged or uncharged areas can be developed or just the edges between charged and uncharged areas. Thus, the areas of the xerographic drum carrying the image pattern of the document and the dot pattern of the retrieval code are developed to visible images by the xerographic developer. As the drum continues around, a feeding device 68 feeds a specular surfaced card of the general category illustrated and described in connection with FIGURE 2 so that it is introduced between drum 57 and transport cylinder 70 in correct synchronization to permit a transfer of the reproduced document and the retrieval code in the appropriate locations on the reflecting surface of the card. In order to provide the correct electrical conditions for transfer of the xerographic image to the storage card 71 it is desirable to place the surface of card 71 at electrical reference or a bias potential. The preferred electrical conditions for transferring the xerographic images to a metallic surface are disclosed in U.S. Patent 3,004,860. As disclosed in that patent it is desirable to apply an electrical charge to the developed xerographic plate before transfer. This charge can be applied by corona discharge device 74. In order to provide an electrical contact to the metallic surface of cards 71 drum 57 is provided with a conductive end portion 72 which is insulated from the remainder of the drum by an insulating ring 73. End portion 72 of drum 57 is maintained at electrical ground. U.S. Patent No. 3,063,859 describes an alternative method for image transfer to a conductive surface. In accordance with that patent, the charging device 74 can be omitted and a potential applied to end portion 72 to facilitate transfer. During the transfer portion of the operational cycle of the xerographic apparatus, conductive end portion 72 of drum 57 rides on the edge of storage card 71 providing a conductive connection that places the metallic surface of the storage card at electrical ground or a transfer potential. Storage card 71 carrying the image and the retrieval code is then advanced by conveyor belt 76 through a fixing station 77, depicted as a radiant heating unit, which softens the xerographic developer material so that it becomes permanently affixed to the storage card. The storage card is then ready for filing in the storage files.

In FIGURE 7 the retrieval code is imprinted on the storage card simultaneously with the information to be stored. This permits a more compact and comprehensive apparatus. However, it may sometimes be more desirable to form the reduced size reproductions of information to be stored separately from coding. For example, when incoming mail to a research laboratory is to be recorded and stored it is preferable to record it immediately and then release the originals for distribution to addresses, etc. Since coding of technical material is usually time consuming and requires skilled personnel, it is, in this situation, more efficient to code a backlog of material already transferred to the file cards. For this purpose an entirely separate coding unit can be used to punch or electrostatically form coding information on the file cards already carrying documentary images.

A complete information storage and retrieval system is illustrated diagrammatically in FIGURES 8 to 11. Storage cards of the type illustrated in FIG. 5 having a transparent photoconductive insulating layer and a conductive backing are used with this system eliminating the need for the xerographic drum, transfer, and cleaning devices used in the embodiment of FIGURE 7. The cards are fed from magazine 80 by feeding mechanism 81 between driver guide rollers 82 onto moving belt 83. Belt 83 is a conductive flexible continuous member suitably of stainless steel and is connected to electrical reference as through pulley 85. As a storage card is fed onto belt 83, electrical charging device 86, depicted as a corona discharge device, applies an electrostatic charge to the photoconductive insulating layer. The electrostatic charge applied by device 86 has the dual function of sensitizing the card to light and producing an electrical force causing the card to adhere to conductive belt 83. The electrical reference connected to pulley 85 is applied to the conductive backing of the storage card through belt 83. Belt 83 transports the card into the focal plane of camera 88 which projects a reduced sized image of original 87 onto a portion of the storage card. After the card has been exposed, it is transported by belt 83 into a developing zone where developing device 90 depicted as a powder cloud developing device applies electroscopic developer particles to the card in image configuration. Suitable powder cloud developing apparatus is disclosed in U.S. Patent 2,965,069 by way of example. After development, the card is advanced under fusing device 91 which softens the developing powder so that it fuses to the surface of the card making a permanent record. As those skilled in the art will observe, the image thus produced is a mirror image and not a direct reading image. The card is then advanced between rollers 93 into code punching device 95. At the point where the card separates from belt 83, corona discharge device 92 is positioned to neutralize the electrical forces holding the card to the belt. An AC corona produced by applying high voltage AC to the discharge device has proven effective in removing residual electrostatic charge forces. Code punching device 95 includes a register 98 for actuating punch solenoids 96 in the proper sequence as set by code selector 100. Punch plate 97 supports the card during punching. As has been previously discussed, the coding is applied to a portion of the card not carrying an image. Conventional card positioning and card position detecting devices (not illustrated) used with card punch machines are contemplated to insure punching in the correct portions of the card. From code punching device 95 the cards are transmitted to a storage device illustrated in FIG. 9 as a card file cabinet.

When it is desired to retrieve cards bearing certain categories of information, the cards are transmitted from the storage device of FIG. 9 to a card sorter. FIGURE 10 is a diagrammatic illustration of a card sorting device in which cards are fed from a magazine 101 through driven guide rollers 102 past detection means 103. Detection means 103 are depicted as photodetectors, however, electrical brush detectors as are more conventional in card sorting machines are just as suitable. In operation, a code indicative of the information categories desired is punched on Read Code Selector 105 and is stored in register 106. When a card carrying the selected code is detected, the register activates solenoid 107 which raises one end of deflector plate 108, deflecting the card into the selected card hopper 110. Cards not having the selected code pass over deflector plate 108 into card return hopper 111 from which they are returned to the storage device.

Figure 11:
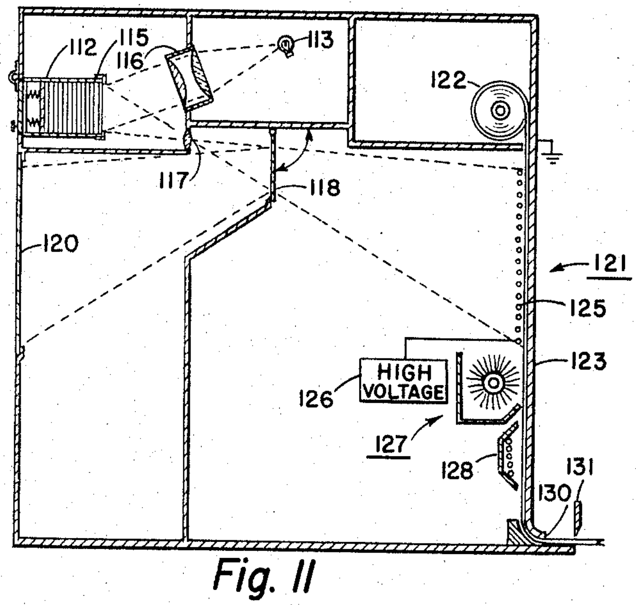

The selected cards are transmitted to magazine 112 of the PROXI viewer-printer diagrammatically illustrated in FIGURE 11. This magazine positions the selected cards in sequence for projection at frame 115. Light source 113 is concentrated through condensing lens 116 on a card in frame 115 at an angle of incidence which is preferably as small an angle away from normal as will permit positioning of objective lens 117 in an unobstructed path of reflection. Since developer material on the card diffuses the light, only the undeveloped areas of the card reflect light at an angle of reflection equal to the angle of incidence from light source 113. The reflected light passes through objective lens 117 and is reflected by a mirror 118 onto a screen of frosted glass 120 or the like. In this projection, as can be seen in FIGURE 11, the image is enlarged back up to the size of the original or the projection system can be arranged to make it even larger if desired. The use of a specular reflecting surface on the information card and a projection system that projects the specularly reflected light enables a very high degree of efficiency as compared with conventional opaque projections systems. Thus, a well illuminated direct-reading image can be observed on the screen 120. When a printout is desired of the information on a particular card the mirror 118 is moved up out of position from the projected light. This permits the image reflected from the information card to be directed onto electrophotographic reproducing paper at reproducing station 121. For this purpose a roll of electrophotographic paper 122 is supported in position for advancing paper across reproducing station 121. This electrophotographic reproducing paper conventionally has a relatively conducting flexible support layer coated with a photoconductive insulating material such as zinc oxide powder in an insulating resin binder. In operation the paper is drawn down through the reproducing station so that the surface coated with the photoconductive insulating material faces the projection ssytem. The back or uncoated side of the electrophotographic paper rides against a conductive support member 123 which is connected to electrical ground reference. With the paper in position an electrostatic charge is placed on the photoconductive insulating surface by in-place charge device 125. Such a device is described in detail in U.S. patent application Ser. No. 44,300 filed July 21, 1960. High voltage source 126 applies an activating voltage to in-place charging device 125 for charging the electrophotographic paper. The paper may be charged before or simultaneously with exposure to the image projected from information card in frame 115. After exposure the paper is advanced through developing sation 127 in which the developing device is depicted as a brush development device and can be, by way of example, a magnetic brush development device such as disclosed in U.S. Patent 2,975,-758. After development the electrophotographic paper carrying the developed image passes through fusing station 128 where heat or vapor is applied to the developed image softening the image material until it fuses to the paper. After fusing, the paper carrying the image is advanced out of the apparatus through slot 130 and may be cut off by knife 131.

While some attention has been devoted to systems for implementing the present invention, there is no intention to be limited thereby. The invention lies in the novel storage medium and method for the economical and facile handling of miscellaneous documentary information. While the fact that this invention provides an alternative to prior conventional media and methods of information storage which is significant in itself, it should also be noted that the present invention opens the way to drastic cost reduction in the consumable materials and permits the use of opaque storage cards from which images can be projected with a light efficiency comparable to and improved over that attained with transparencies.

What is claimed is:

1. A method of recording documentary information to be stored comprising:
- forming an optical representation of said documentary information with size reduction on a first portion of a highly specular photoconductive surface of a record card,
- xerographically producing a diffusely reflecting image of said documentary information on said first portion of said card,
- applying a latent electrostatic retrieval code to a second portion of said record card and, developing said latent electrostatic retrieval code.

2. An information storage and retrieval system comprising in combination:
- a reproducing and coding unit including,
- means for forming a reduced xerographic image on a highly specular reflecting surface of a business machine card, and
- means for coding said card with a xerographically formed retrieval code,
- a storage unit adapted to store coded image bearing business machine cards,
- an enlarger viewer unit adapted to project an image of light specularly reflected from said business machine cards onto a viewing screen, and
- a retrieval unit adapted to withdraw and transfer image bearing business machine cards from said storage unit to said enlarger viewer unit according to the coded information contained on said cards.

3. An information storage and retrieval system including:
- a xerographic drum,
- means for applying a retrieval code for an original document in the form of a latent electrostatic dot pattern to a first portion of said xerographic drum,
- means for forming a latent electrostatic reduced image of said original document to a second portion of said xerographic drum,

- means for synchronizing said image forming means with said dot forming means,
- means for developing both said latent electrostatic reduced image and said latent electrostatic dot pattern,
- means for feeding a business machine card having a highly specular reflecting surface to said drum,
- means for transferring both the developed image and the developed dot pattern to a highly specular surface of a business machine card, and
- means to fix both the developed image and the developed dot pattern to said card.

4. Apparatus for information recording and coding adapted to apply a reduced documentary image and a retrieval code to a highly specular metallic surface of a file card comprising:
- (a) means to form a latent electrostatic reduced image of an original document on one portion of a xerographic drum,
- (b) means to apply a retrieval code for said document in the form of a latent electrostatic dot pattern to an adjacent portion of said drum,
- (c) means to develop both said latent electrostatic image and said latent electrostatic dot pattern,
- (d) means to transfer both the developed image and the developed dot pattern to a highly specular metallic surface of a file card, and
- (e) means to fix both the developed image and the developed dot pattern to said card.

5. A business machine card for use in an information storage and retrieval system of the type wherein graphic information is stored on a card along with coded information comprising:
- a flexible base support layer, and
- a flexible specular reflecting layer mounted on the base support layer with the graphic and coded information thereon in the form of particulate image patterns,
- the reflecting surface having an absolute reflectivity of about 75% to 95%.

6. A business machine card according to claim 5 in which said flexible specular reflecting layer comprises an evaporated metal layer coated with a transparent organic photoconductive insulating material.

References Cited

UNITED STATES PATENTS

| | | | |
|---|---|---|---|
| 2,909,971 | 10/1959 | Barber | 235—61.115 |
| 3,002,434 | 10/1961 | Reuter | 95—1.7 |
| 3,045,587 | 7/1962 | Schwertz | 346—74 |
| 3,051,041 | 8/1962 | Lehmann et al. | 95—1.7 |
| 3,052,564 | 9/1962 | Kulesza | 235—61.12 |
| 3,100,427 | 8/1963 | Lehmann et al. | 95—1.7 |

OTHER REFERENCES

Dessauer, J. H. et al.: "Xerography Today," Photographic Engineering, vol. 6, No. 4, page 264, 1955.

Mott, G. R. et al.: "Quick Processed Bright Displays by Xerography," Potographic Science and Engineering, vol. 5, No. 2, March-April, 1961, pp. 87–92.

BERNARD KONICK, *Primary Examiner.*

J. BREIMAYER, *Assistant Examiner.*